US005632121A

United States Patent [19]

Handte et al.

[11] Patent Number: 5,632,121

[45] Date of Patent: May 27, 1997

[54] ADJUSTING DEVICE FOR A DOOR WINDOW PANE, FRAMELESS AND COOPERATING WITH A WINDOW LIFTER, OF A MOTOR VEHICLE

[75] Inventors: Horst Handte, Heimsheim; Guenter Schaedlich, Weil der Stadt; Helmut Eck, Rutesheim; Andre Scholz, Wiernsheim, all of Germany

[73] Assignee: Dr. Ing. h.c.F. Porsche AG, Weissach, Germany

[21] Appl. No.: 536,752

[22] Filed: Sep. 29, 1995

[30] Foreign Application Priority Data

Sep. 30, 1994 [DE] Germany .......................... 44 35 008.2

[51] Int. Cl.$^{6}$ .......................... B60J 1/00

[52] U.S. Cl. .......................... 49/502; 49/352

[58] Field of Search .......................... 49/502, 352, 348, 49/227

[56] References Cited

U.S. PATENT DOCUMENTS

| | | | |
|---|---|---|---|
| 3,844,064 | 10/1974 | Yamaha et al. | 49/227 X |
| 4,051,632 | 10/1977 | Fukumoto et al. | 49/227 X |
| 4,761,915 | 8/1988 | Marz | 49/502 X |
| 4,956,942 | 9/1990 | Lisak et al. | 49/502 |

FOREIGN PATENT DOCUMENTS 2205147 9/1972 Germany .

*Primary Examiner*—Philip C. Kannan
*Attorney, Agent, or Firm*—Evenson, McKeown, Edwards & Lenahan, P.L.L.C.

[57] ABSTRACT

An adjusting device for a door window pane of a motor vehicle, preferably made frameless and cooperating with a window lifter, includes at least one upright guide rail running inside a door body for the window lifter, with the guide rail being pivotable around an upper pivot point in the direction transverse to the vehicle and being lockable by the adjusting device engaging in the lower area of the guide rail in a position such that the door window pane abuts an adjoining sealing means in the car body with pretensioning in the marginal area. To permit rapid, simple adjustment of the door window pane without removing the door trim, provision is made such that the guide rail is adjustable by its lower end in the transverse direction with respect to the door window pane in a displacement guide and is lockable by fastening elements that are accessible from the underside of the door body.

13 Claims, 4 Drawing Sheets

ADJUSTING DEVICE FOR A DOOR WINDOW PANE, FRAMELESS AND COOPERATING WITH A WINDOW LIFTER, OF A MOTOR VEHICLE

BACKGROUND AND SUMMARY OF THE INVENTION

The invention relates to an adjusting device for a door window pane, preferably made frameless and cooperating with a window lifter, of a motor vehicle, and, more particularly, to an adjusting device wherein a guide rail of the window lifter extends upright inside a door body and is pivotably mounted around an upper pivot point in the transverse direction of the vehicle and is lockable by the adjusting device engaging the lower area of the guide rail in such a position that a marginal area of the door window pane abuts an adjoining seal in the car body with pretensioning.

An adjusting device of the above-mentioned type for a door window pane of a motor vehicle is known from German Patent document DE 22 05 147. In this system, an upright extending guide rail is provided inside the door body. One end of the guide rail is fastened in the upper part of the door body and forms something close to a rotational axis for the guide rail.

The known guide rail is pivotable in the transverse direction of the vehicle around this upper rotational axis and is lockable in the desired position by an approximately horizontally aligned set screw of the adjusting device. The set screw extends between a lower edge area of the guide rail and an upright section of the door panel and is operable from the passenger compartment.

Since the door panel on the side facing the passenger compartment is usually provided with a door trim, the door trim must be removed to adjust the window pane, involving a high assembly cost.

There is therefore needed an improved adjusting device for a door window pane such that simple rapid adjustment of the door window pane is made possible without removing the door trim.

According to the present invention, this need is met by an adjusting device for a door window pane of a motor vehicle which is preferably made frameless and cooperates with a window lifter. A guide rail of the window lifter extends upright inside a door body and is pivotably mounted around an upper pivot point in the transverse direction of the vehicle and is lockable by the adjusting device engaging the lower area of the guide rail in such a position that a marginal area of the door window pane abuts an adjoining seal in the car body with pretensioning. Guide rails are adjustable at their lower ends in the transverse direction with respect to the door window pane in a displacement guide and are securable by use of fastening elements that are accessible from the underside of the door body.

In certain preferred embodiments, the window lifter has two guide rails arranged with a space between them and running parallel to each other. Each guide rail has a displacement guide associate therewith. Still further, each displacement guide can include a receptacle provided on the door body. The receptacle is in an active connection with a lower end of the guide rails.

In further preferred embodiments, the receptacle is formed on a mounting block which is fastened above a bottom area of the door body on the door panel. An opening which is closable by a plug is provided on the bottom area of the door body beneath the receptacle.

In still further preferred embodiments, the receptacle is integrated into the bottom area of the door body.

In still further preferred embodiments, the receptacle has an upper limiting surface which, when viewed in a transverse direction of the vehicle, is made approximately in the shape of an arc of a circle, with the center of the circle being located approximately at the intersection of the door panel with a central axis of an upper fastening element of the guide rails. Further, the correspondingly shaped wall section of a retaining angle is displaceably mounted on the upper limiting surface of the receptacle.

In yet further embodiments according to the present invention, the receptacle, when viewed in cross-section, is shaped approximately in a U-shape with the open side of the receptacle being directed downward. Still further, the retaining angles located on the lower edge of the guide rails are mounted such that they will not twist on receptacles of the door body.

In yet further preferred embodiments, on the upper limiting surface of the receptacle, an elongate slot opening extending in the transverse direction of the vehicle is provided through which the fastening elements pass to secure the guide rails.

In further preferred embodiments, a downwardly directed threaded bolt is mounted on the retaining angle in the vicinity of a U-shaped molding. The bolt passes through a slot opening of the receptacle. A nut is screwed onto the free, projecting end of the threaded bolt.

The primary advantages achieved with the present invention consist in the fact that by providing a displacement guide extending in the transverse direction with respect to the door window pane between the lower end of the guide rail and the door body, a simple and rapid adjustment of the door window pane is achieved both during initial assembly and at a later point in time (readjustment). It is further possible to avoid removing the interior trim of the door by providing a fastening element mountable from the underside of the door body for securing the guide rail. The components of the adjusting device according to the invention can be manufactured simply and economically. By means of the positive engagement of the body side reception device by a retaining angle mounted at the lower end of the guide rail, the guide rail is locked in the lengthwise and heightwise directions of the vehicle, and cannot twist when the nut is mounted on the threaded bolt.

The body side reception device is either made integral with a bottom area of the door body or is formed by a retaining support connected locally with the door panel.

Other objects, advantages and novel features of the present invention will become apparent from the following detailed description of the invention when considered in conjunction with the accompanying drawings.

DETAILED DESCRIPTION OF THE DRAWINGS

Figure 3:
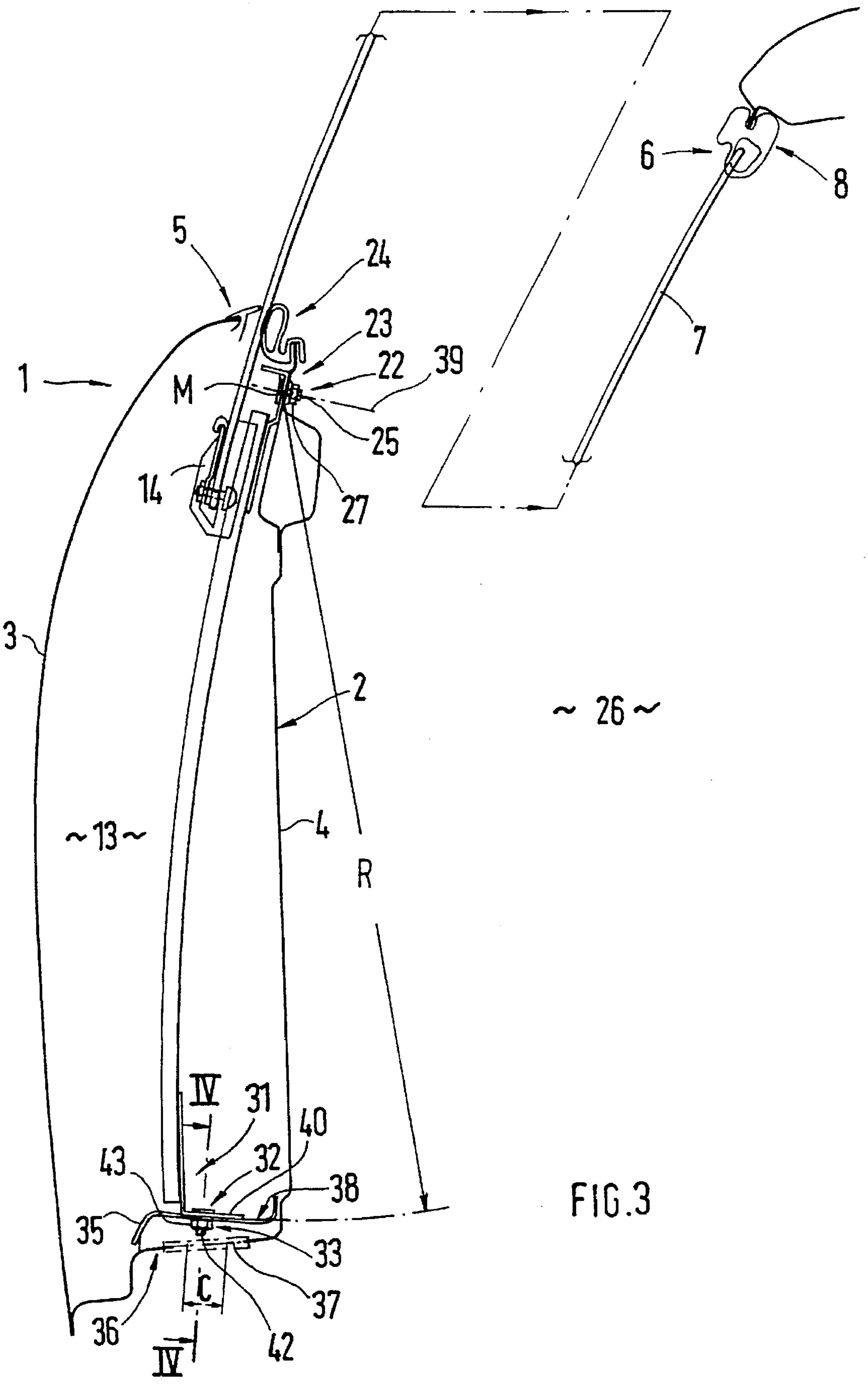
FIG. 3 is a view looking in the direction of arrow R in FIG. 1, enlarged and partially in section.

Referring to FIGS. 1–4, a side door 1 of a motor vehicle, especially an automobile, includes a door body 2, composed of an outer door panel 3 and an inner door panel 4 (FIG. 3).

Door 1 is made frameless above a belt line 5, i.e. an upper marginal area 6 of a door window pane 7, when the door is closed, directly abuts a sealing means 8 on the car body.

Figure 1:
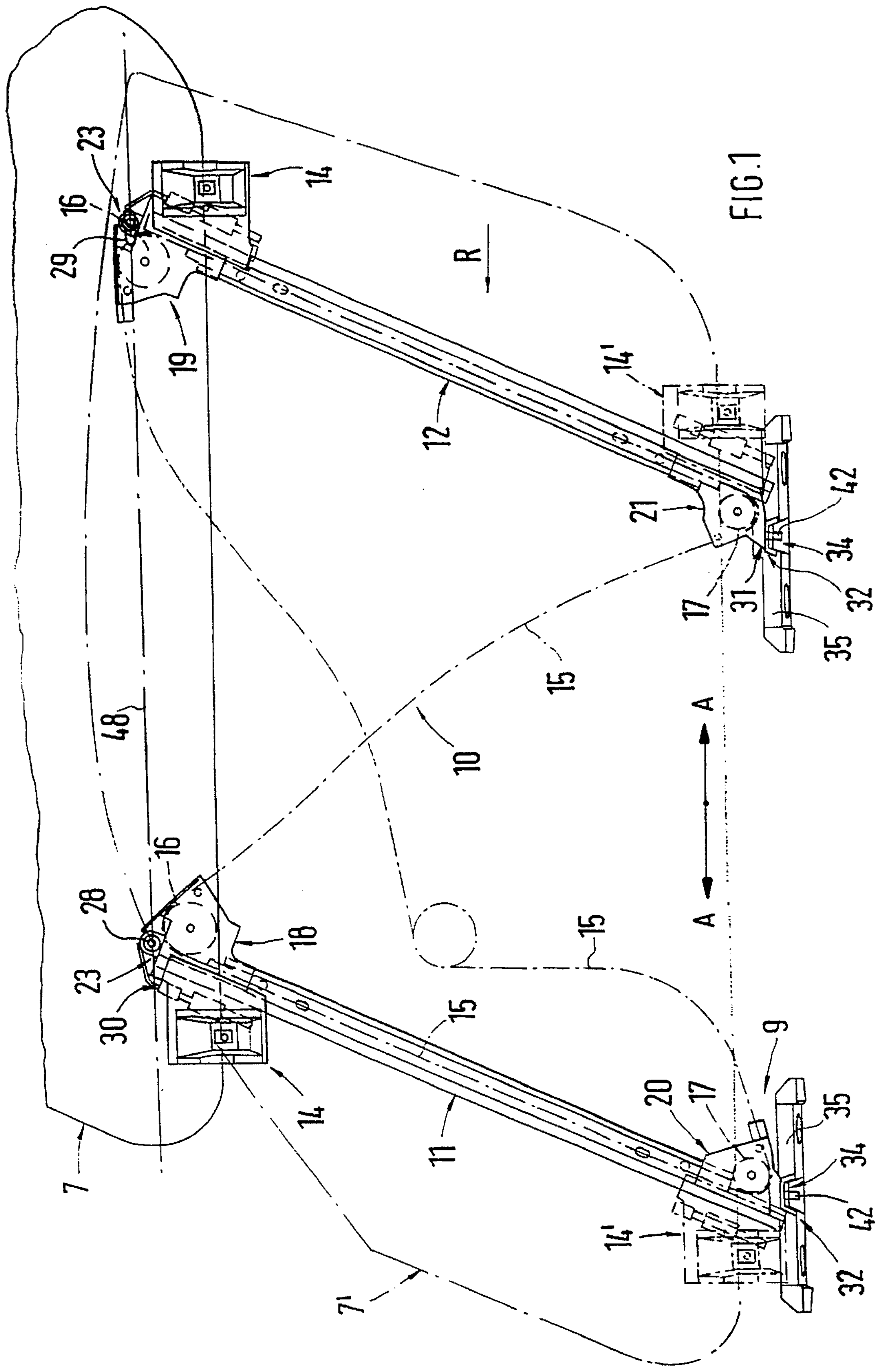
FIG. 1 is a partial side view of a door window pane cooperating with a window lifter, with an adjusting device.
Figure 2:
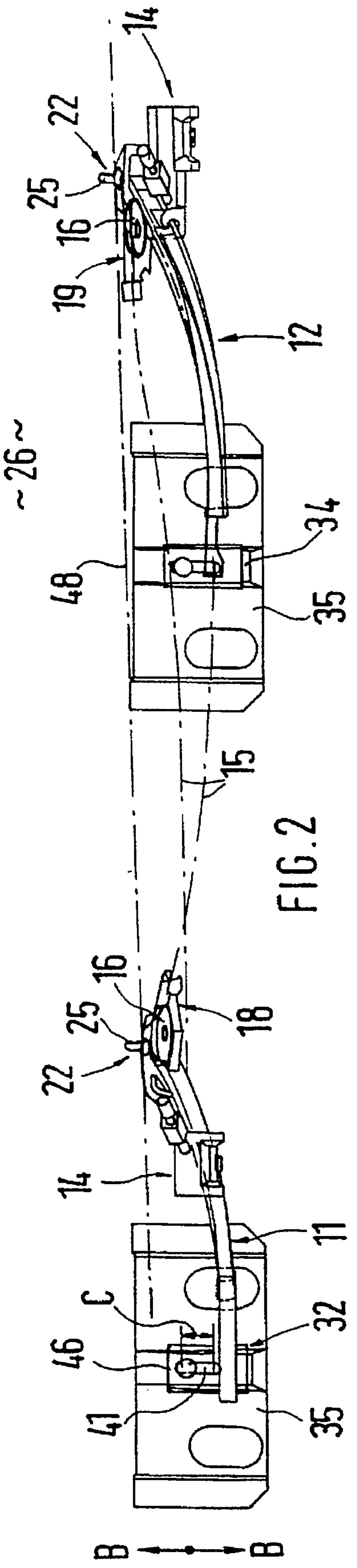
FIG. 2 is a top view of the window lifter and the adjusting device.
Figure 4:
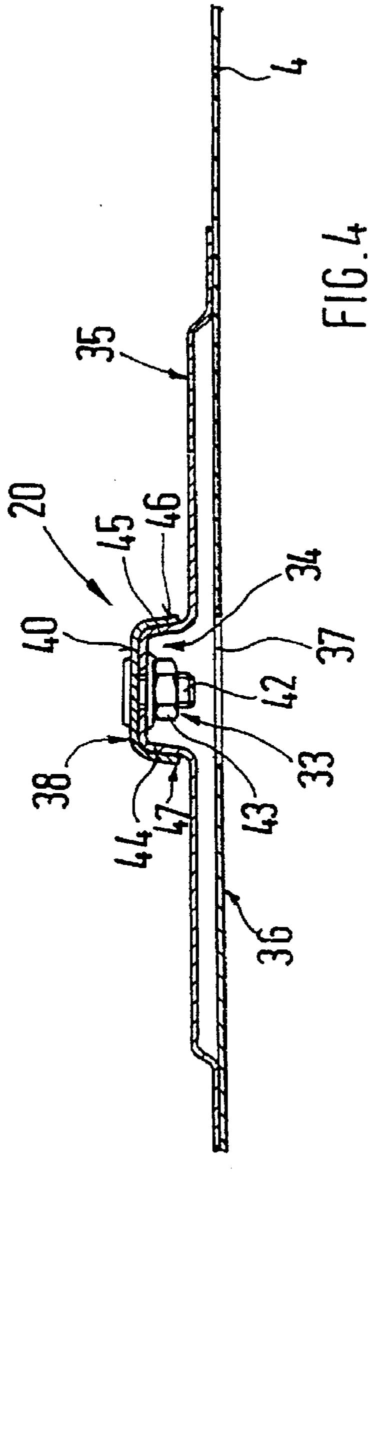
FIG. 4 is a section view taken along line IV—IV in FIG. 3 on an enlarged scale.

Referring to FIG. 1, door window pane 7 cooperates with a window lifter 9, which in the embodiment is formed by a double cable window lifter 10. In the lowered position, door window pane 7 assumes position 7' (FIG. 1) and then extends completely inside door body 2.

Window lifter 9 comprises a front guide rail 11 and a rear guide rail 12, with the upwardly extending two guide rails 11, 12 being arranged approximately parallel to one another in the installed position and extending inside a cavity 13 (FIG. 3) in door body 2.

Each shaped guide rail 11, 12 cooperates with a height-adjustable sliding element 14, permanently attached to door window pane 7. This can be accomplished by clamping, screwing, or the like.

Each sliding element 14 cooperates with a drive cable 15, with drive cable 15 being guided around upper and lower reversing elements 16, 17. Reversing elements 16, 17 are formed by rotatable rollers or partial areas of rollers.

Each guide rail 11, 12 is provided with an upper retaining angle bracket 18 or 19 and a lower retaining angle bracket 20 or 21, with fastening elements 22 being provided on upper retaining angle brackets 18, 19 to hold guide rails 11, 12 on door body 2.

Retaining angle brackets 18, 19, 20, and 21 can be formed by separate components which are permanently attached to guide rails 11, 12. However it is also possible to integrate retaining angle brackets 18 and 19 and 20 and 21 into guide rails 11 and 12.

The upper end 23 of each guide rail 11, 12 is fastened to door panel 4 adjacent to a door pocket 24 of door body 2. For this purpose, a threaded bolt 25 is mounted locally at upper retaining angle bracket 18, 19. The bolt 25 passes through an opening in door panel 4 and projects beyond the latter in the direction of the passenger compartment 26. A nut 27 is threaded onto the projecting end area of threaded bolt 25. Threaded bolt 25 is aligned roughly at right angles to the adjoining portion of door panel 3 (FIG. 3).

In order for the two guide rails 11, 12 to be aligned parallel to one another in the installed position, one of the two openings 28, 29 in door panel 3 is made in the form of an opening that is an elongate hole (for example 29), extending in the lengthwise direction of the vehicle.

A stop 30 is provided locally on upper retaining angle brackets 18, 19 by which the topmost position of the sliding element 14 cooperating with guide rails 11, 12 is determined. Upper reversing element 16 for drive cable 15 is provided on upper retaining angle brackets 18 and 19.

In order for the door window pane 7 to produce a sufficient seal under pretensioning against adjoining sealing means 8 on the automobile body in vehicles with frameless doors, an adjusting device 31 is provided for adjusting the door window pane 7. The device engages a lower marginal area of guide rails 11, 12.

According to the invention, the lower end of the guide rails 11, 12 is adjustable transversely with respect to plane A—A of the door window pane 7 in a displacement guide 32 and is securable by use of the fastening elements 33 which can be operated without removing a door trim not shown in greater detail, from the underside of door body 2.

In the embodiment, a displacement guide 32 is associated with each of the two guide rails 11, 12.

Each displacement guide 32 comprises a receptacle 34 provided on door body 2, which is in an active connection with one lower end of guide rails 11, 12.

Receptacle 34 is formed on a mounting block 35 which is fastened above a bottom area 36 (FIG. 4) of door body 2 on door panel 4. This can be accomplished by screwing, riveting, welding, or the like.

Bottom area 36 of door body 2 has an opening 37 closable by a removable plug beneath receptacle 34 of mounting block 35.

Figure 4A:
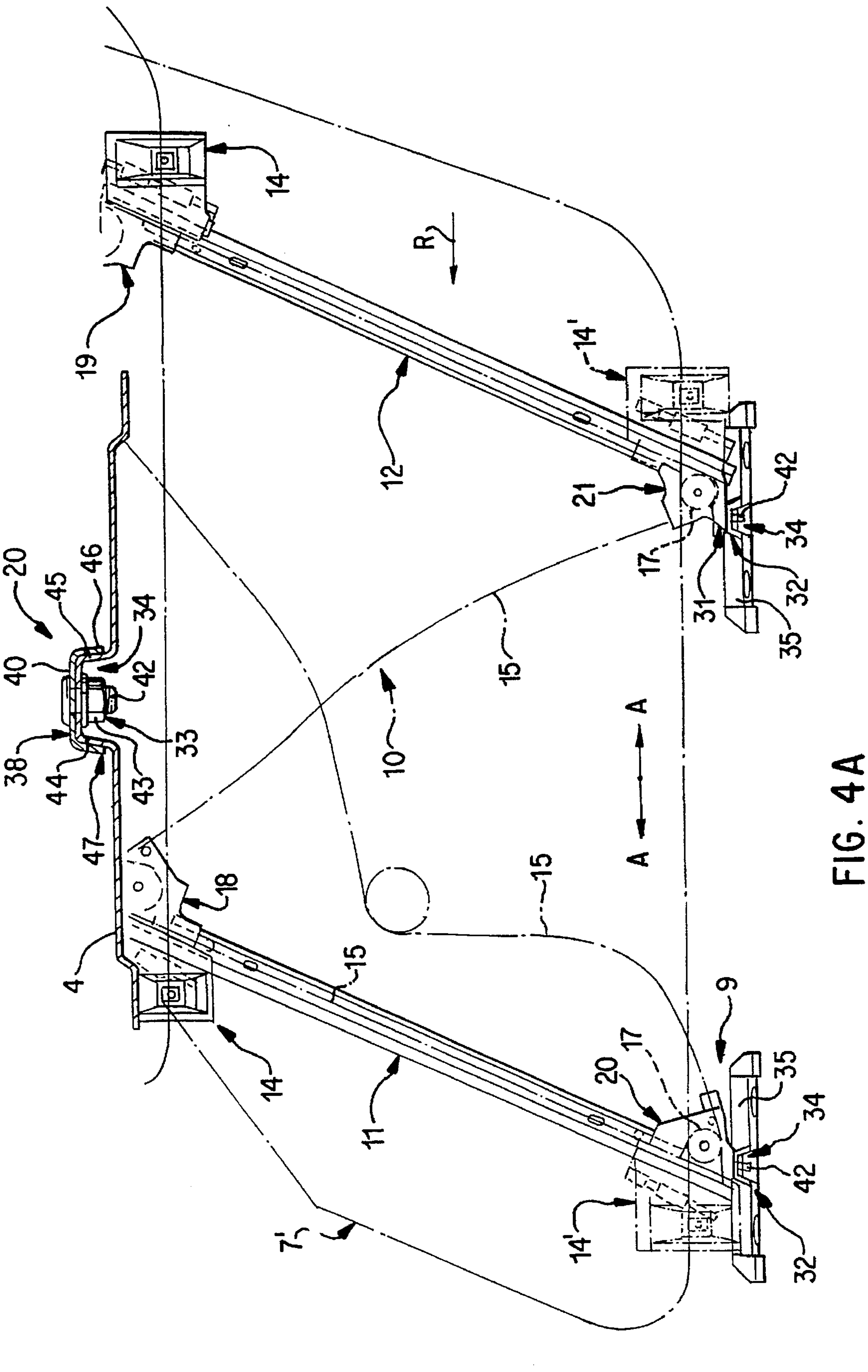
FIG. 4*a* is a section view taken along line IV—IV in FIG. 3 of a further embodiment of the invention.

Instead of the additional mounting block 35 however, receptacle 34 can also be integrated into the bottom area 36 of door body 2 (FIG. 4*a*).

Receptacle 34 has an upper limiting surface 38 projecting upward in the direction of guide rails 11, 12. The upper limiting surface 38 is formed approximately as an arc of a circle, having the diameter R (FIG. 3), as viewed in the transverse direction B—B of the vehicle. The center of the circle M is located approximately at the intersection of door panel 4 with a central axis 39 of threaded bolt 25 of upper retaining angle bracket 18, 19 of guide rails 11, 12. Guide rails 11, 12 are movable in the direction transverse to the vehicle by a certain amount C around this center of the circle M. The upper limiting surface 38 can also be aligned tangentially to the center of the circle M. In this case, openings 28, 29 must be made larger than the diameter of threaded bolt 25.

A correspondingly designed and adjusted wall section 40 of lower retaining angle bracket 20, 21 of guide rails 11, 12 is displaceably mounted on this upper limiting surface 38. On the upper limiting surface 38, an elongate slot opening 41 is formed extending in a direction transverse to the vehicle, through which fastening elements 33 to secure guide rails 11, 12 pass.

Fastening elements 33 are formed by a threaded bolt 42 extending upright which is mounted on lower retaining angle bracket 20, 21. Threaded bolt 42 projects through slot opening 41. At the end area of threaded bolt 42 that projects downward, a nut 43 is screwed on and abuts the underside of limiting surface 38 or a washer.

Receptacle 34 is made approximately U-shaped in profile in the embodiment, with the open side directed downward. The two legs 44, 45 of receptacle 34 run diagonally from the inside at the top to the outside at the bottom.

In order for guide rails 11, 12 not to twist when mounted, a twist protector 47 is provided on lower retaining angle brackets 20, 21 which cooperates positively with receptacle 34.

In the embodiment, twist protector 47 is formed by a U-shaped molding 46 that is directed downward and provided on retaining angle bracket 20, 21. The molding 46 is mounted positively on U-shaped receptacle 34. Twist protector 47, however, can also be formed by a downwardly projecting flange or a pin which is in a positive working connection with receptacle 34.

The U-shaped twist protector 46 simultaneously secures guide rails 11, 12 in the lengthwise direction of the vehicle.

A straight line 48 that connects the two upper mounts 22 of guide rails 11, 12 with one another constitutes a theoretical axis of rotation for adjusting the pretensioning of door window pane 7.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An adjusting device cooperating with a window lifter for a door window pane of a motor vehicle having a car body and a door body, comprising:

at least one guide rail forming a portion of the window lifter, said guide rail extending upright inside the door body and being pivotably mounted around an upper pivot point in a transverse direction of the vehicle;

wherein said guide rail is lockable by the adjusting device engaging a lower area of the guide rail in a position such that a marginal area of the door window pane abuts under pretension an adjoining seal in the car body;

a displacement guide provided on the door body for adjusting said guide rail at its lower end in the transverse direction with respect to a door window pane, said displacement guide comprising a receptacle extending transversely with respect to the door window pane, said lower end of the guide rail resting in a slidable manner on said receptacle; and fastening elements associated with the displacement guide for securing said guide rail on the receptacle, said fastening elements being accessible from an underside of the door body.

2. An adjusting device according to claim 1, wherein said window lifter comprises at least two guide rails spaced apart and parallel to one another, each of said guide rails having an associated displacement guide.

3. An adjusting device according to claim 2, wherein each of said displacement guides comprises a receptacle provided on the door body, said receptacle being in active connection with a lower end of said associated guide rail.

4. An adjusting device according to claim 3, wherein said receptacle is formed on a mounting block fastened above a bottom area of the door body on a door panel.

5. An adjusting device according to claim 4, wherein said bottom area of the door body has an opening closable by a plug, said opening being arranged beneath the receptacle.

6. An adjusting device according to claim 3, wherein said receptacle is integrated into a bottom area of the door body.

7. An adjusting device according to claim 3, wherein on an upper limiting surface of said receptacle, an elongate slot opening extends in the transverse direction of the vehicle, said fastening elements extending through said elongate slot opening to secure said guide rails.

8. An adjusting device according to claim 7, wherein said fastening elements include a downwardly directed threaded bolt on a retaining angle bracket coupled to the lower end of the guide raid, said bolt being mounted in the vicinity of a U-shaped molding provided on the retaining angle bracket, said threaded bolt passing through said elongate slot opening of the receptacle, and wherein a nut is screwed onto a free, projecting end of said threaded bolt.

9. An adjusting device according to claim 1, wherein said door window pane of the motor vehicle is frameless.

10. An adjusting device according to claim 1, wherein said receptacle prevents said guide rail from twisting when said fastening elements are tightened.

11. An adjusting device cooperating with a window lifter for a door window pane of a motor vehicle having a car body and a door body, comprising:

at least one guide rail forming a portion of the window lifter, said guide rail extending upright inside the door body and being pivotably mounted around an upper pivot point in a transverse direction of the vehicle;

wherein said guide rail is lockable by the adjusting device enraging a lower area of the guide rail in a position such that a marginal area of the door window pane abuts under pretension an adjoining seal in the car body;

a displacement guide provided on the door body for adjusting said guide rail at its lower end in the transverse direction with respect to a door window pane;

fastening elements associated with the displacement guide for securing said guide rail in the displacement guide in an adjusted position with respect to the motor vehicle, said fastening elements being accessible from an underside of the door body;

wherein said window lifter comprises at least two guide rails spaced apart and parallel to one another, each of said guide rails having an associated displacement guide; and wherein each of said displacement guides comprises a receptacle provided on the door body, said receptacle being in active connection with a lower end of said associated guide rail; and wherein said receptacle includes an upper limiting surface which, viewed in the transverse direction of the motor vehicle, forms an approximate circular arc shape, with a center of said circular arc being located approximately at an intersection of the door panel with a central axis of an upper fastening element of the guide rails, and further wherein a correspondingly shaped wall section of a retaining angle bracket is displaceably mounted on the upper limiting surface of said receptacle.

12. An adjusting device cooperating with a window lifter for a door window pane of a motor vehicle having a car body and a door body, comprising:

at least one guide rail forming a portion of the window lifter, said guide rail extending upright inside the door body and being pivotably mounted around an upper pivot point in a transverse direction of the vehicle;

wherein said guide rail is lockable by the adjusting device engaging a lower area of the guide rail in a position such that a marginal area of the door window pane abuts under pretension an adjoining seal in the car body;

a displacement guide provided on the door body for adjusting said guide rail at its lower end in the transverse direction with respect to a door window pane;

fastening elements associated with the displacement guide for securing said guide rail in the displacement guide in an adjusted position with respect to the motor vehicle, said fastening elements being accessible from an underside of the door body; and wherein said receptacle has a cross-sectional shape forming an approximate U-shape, an open side of said U-shape being directed downward.

13. An adjusting device according to claim 12, further comprising retaining angle brackets mounted on a lower edge of said guide rails such that they do not twist on said receptacles of the door body.

* * * * *